UNITED STATES PATENT OFFICE.

VICTOR FRESTADINS, EVERT NORLIN, AND ERIK OMAN, OF STOCKHOLM, SWEDEN.

METHOD OF PRESERVING ALIMENTS.

1,074,856. Specification of Letters Patent. Patented Oct. 7, 1913.

No Drawing. Application filed September 4, 1912. Serial No. 718,563.

*To all whom it may concern:*

Be it known that we, VICTOR FRESTADINS, EVERT NORLIN, and ERIK OMAN, subjects of the King of Sweden, residing at Brunkebergstorg 11, Stockholm, Sweden, have invented new and useful Improvements in Methods of Preserving Aliments, of which the following is a specification.

The present invention has for its object to provide a method of preserving aliments, such as fruits, berries, vegetables, mushrooms and roots, which has the special advantage of permitting the retaining of the appearance and taste of the aliments and of making them more durable than hitherto has been possible, even by means of repeated sterilization.

The method, which is based on the treatment in vacuum already employed for preserving, consists in introducing the material to be preserved (fruits, berries, vegetables, mushrooms, roots) in vessels adapted to be hermetically closed together with a taste-producing, preserving liquor or solution, which consists of sugar or salt according to the qualities of the material, and which is highly concentrated, whereupon the vessels together with their contents are evacuated and heated during a time (usually ten minutes–two hours) and to a temperature (usually 60°–100° C.) which of course vary according to the qualities of the material, and that the latter, eventually after being cooled and left for some time, is subjected to a similar treatment in a diluted liquor or solution, the concentration of the latter being so chosen in proportion to that of the first liquor as to give the end product the desired sweet or salt taste (by mixing the concentrated liquor present in the material with the diluted one added). The liquor used in the first treatment may also be used, after being diluted, for the second treatment, although fresh diluted liquor then may also be used. The excess of diluted liquor may be concentrated by evaporization (which may be done in vacuum) and used again for the first treatment (after the addition of more sugar or salt, if necessary). Instead of using a liquor of sugar or salt in the first treatment the material may of course also be mixed with sugar or salt in solid form which then forms the required high-concentrated liquor together with the juice of the material, and instead of the diluted liquor pure water may be used for the second treatment. The vacuum in the preserving vessel may either be about the same during the first as during the second treatment, or it may be higher during the former, which has proved to be advantageous for conserving the shape especially of soft vegetable particles.

By the present preserving process, including the treatment of the material first in a concentrated and then in a diluted liquor under vacuum and heating, the material will be caused to absorb readily in the first treatment a greater quantity of the taste-giving, preserving material (sugar or salt) than in using a more diluted liquor. Hereby the advantages are gained, that the sterilization will be speedy and complete, because solutions of salt and sugar act the more preserving the higher their concentration is, and further that the material at once assumes the desired sweet or salt taste, but in the same time retains its natural taste rather unaffected. In the subsequent treatment by the weaker liquor the material gives away part of the absorbed taste-giving and preserving material, so that the end product (the material to be preserved together with the liquor) obtains the desired sweet or salt taste. Especially in preserving material with a very soft fruit flesh (for instance strawberries), the material will swell during the evacuation of the first treatment and thus change its form, and by using less evacuation at the second treatment the material can be caused to resume its original shape and appearance. A further advantage is that the material, on account of its specific gravity being increased by the first treatment, at the second treatment in the weaker liquor will sink in the latter, as distinguished from for instance compote produced in the households where the said material floats.

A jam prepared according to the present process requires less quantity of sugar than usually and the sugar is not liable to crystallize out. Moreover, the berries of the same will become sweet at once, as distinguished from jams prepared in the households, where the berries do not become sweet before they have been stored for some time.

Having now particularly described the nature of our invention and the manner of its operation, what we claim is:

1. A method of preserving aliments comprising first evacuating the material and heating the same with a concentrated solution of a preserving agent and then treating the material in a similar manner with a dilute solution of such preserving agent to give the desired taste to the final product.

2. A method of preserving aliments comprising first heating the same under a high vacuum with a concentrated solution of a preserving agent and then treating the material in a similar manner with a dilute solution of such preserving agent under a lower vacuum to give the desired taste to the final product.

3. A method of preserving aliments comprising first heating the same under a vacuum with a concentrated solution of a preserving agent, diluting such solution, and treating the material with such diluted material in a similar manner to give the desired taste to the final product.

4. A method of preserving aliments comprising first adding to such material a preserving agent to form with the juice of such material a concentrated solution of such preserving agent, heating the material with such concentrated solution under a vacuum, and then heating the material with a dilute solution of such preserving agent to give the desired taste to the final product.

5. A method of preserving aliments comprising first evacuating the material and heating the same with a concentrated solution of sugar, and then treating the material in a similar manner with a dilute solution of sugar to give the desired taste to the final product.

6. A method of preserving aliments comprising first heating the same under a high vacuum with a concentrated solution of sugar and then treating the material in a similar manner with a dilute solution of sugar under a lower vacuum to give the desired taste to the final product.

7. A method of preserving aliments comprising first heating the same under a vacuum with a concentrated solution of sugar, diluting such solution, and then treating the material with such diluted material in a similar manner to give the desired taste to the final product.

In testimony whereof we have signed our names to this specification in the presence of two subscribing witnesses.

VICTOR FRESTADINS.
  EVERT NORLIN.
  ERIK OMAN.

Witnesses as to Victor Frestadins and Evert Norlin:
 M. ANDERSON,
 RIEQES FAGERSTER.

Witnesses as to Erik Oman:
 GRETA PRIM,
 JACOB BOGGE.

---

Copies of this patent may be obtained for five cents each, by addressing the "Commissioner of Patents, Washington, D. C."